March 28, 1967  K. B. KELLY  3,311,412

SEAT BELT TENSION INDICATOR

Filed April 15, 1966

INVENTOR.
Kent B. Kelly
BY
Paul Fitzpatrick
ATTORNEY

United States Patent Office 3,311,412
Patented Mar. 28, 1967

3,311,412
SEAT BELT TENSION INDICATOR
Kent B. Kelly, Lake Orion, Mich., assignor to General Motors Corporation, Detroit, Mich., a corporation of Delaware
Filed Apr. 15, 1966, Ser. No. 542,800
5 Claims. (Cl. 297—385)

This invention relates to an automobile safety seat belt system with a built-in tension indicator. More particularly, the present invention relates to a safety seat belt assembly for use in an automobile which includes a tension indicator in the seat belt buckle assembly which indicates to the user whether or not the seat belt assembly has been fastened with the proper tension on the belt.

The installation of safety seat belts in automobiles has become extremely popular and is mandatory by law in many areas. The purpose of safety seat belts in an automobile is, naturally, to reduce personal injury resulting from automobile accidents. Although most automobiles have safety seat belts installed therein, the occupants of the automobile frequently fail to tightly cinch their seat belts, particularly on short trips such as are normally experienced in city driving.

The present invention provides a practical and economical solution to the problem of improper use of the seat belt when the vehicle is in operation and includes a spring biased indicator loop which is fastened to the seat belt and the latch plate and which has an indicator portion which is visible only when there is insufficient tension applied to the belt.

Other objects, features and advantages of this invention will become obvious upon reference to the following detailed description and the drawings depicting the preferred embodiment thereof, wherein.

Figure 1:
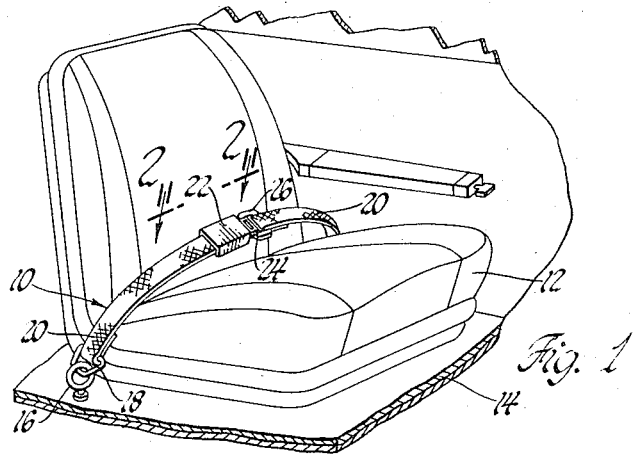
FIGURE 1 is a schematic view of a seat belt assembly incorporating the present invention and used in conjunction with a vehicle seat.
Figure 2:
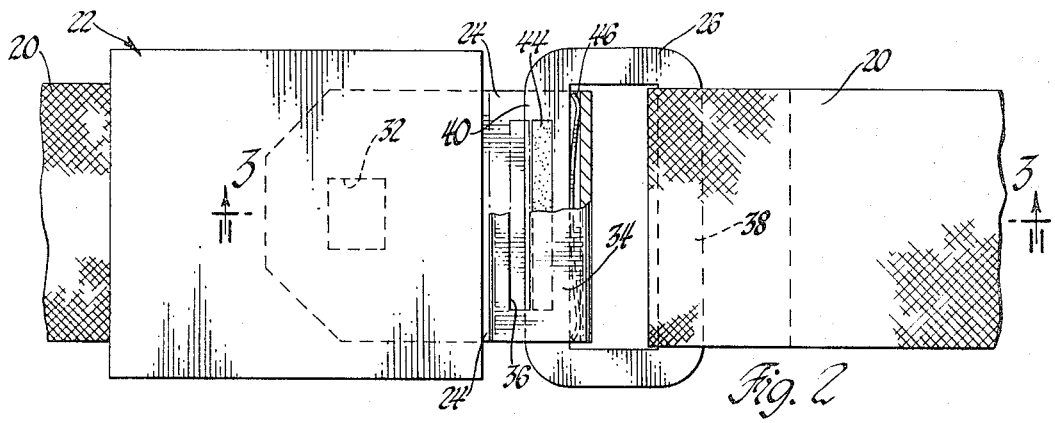
FIGURE 2 is a plan view with parts broken away and in section taken in the plane of lines 2—2 in FIGURE 1.

Generally, FIGURE 1 shows a safety seat belt assembly 10 as used in connection with a vehicle seat 12 which is fastened to a vehicle floor pan 14. The seat belt assembly 10 is anchored to the vehicle floor pan 14 by means of an eyebolt anchorage 16 which is bolted to the floor 14 and a ring 18 to which the length of belt 20 is attached. The length of belt 20 is fastened at its other end to a buckle member 22 which is adapted to cooperate with a latch plate 24 which is connected to the other half of belt 20 by means of a rectangular loop 26. The details of this buckle and latch plate combination can best be seen by reference to FIGURES 2 and 3. The buckle 22 may be of any suitable type having a spring 28 biasing a latch 30 into engagement with an aperture 32 in the latch plate 24. The latch plate 24 terminates in a reversely bent portion 34 which includes a narrow indicator slot 36 in its upper surface. One length of the seat belt 20 is fastened to one leg 38 of the rectangular loop 26.

Figure 3:
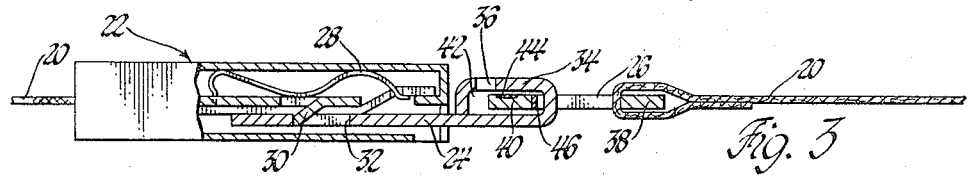
FIGURE 3 is a sectional view taken in the plane of lines 3—3 in FIGURE 2.
Figure 4:
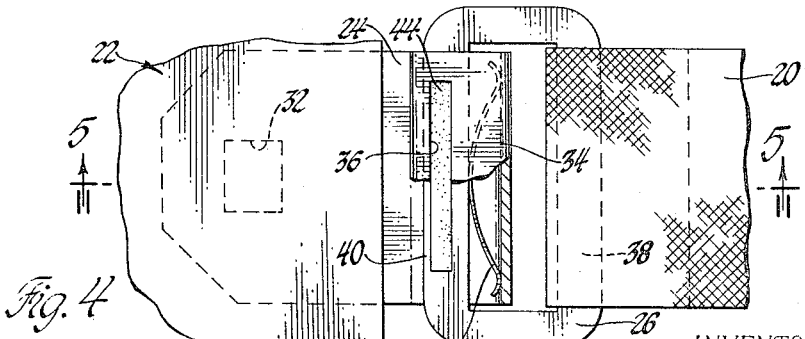
FIGURE 4 is the same view as FIGURE 2 but showing the seat belt with improper tension so that the indicator portion is visible.
Figure 5:
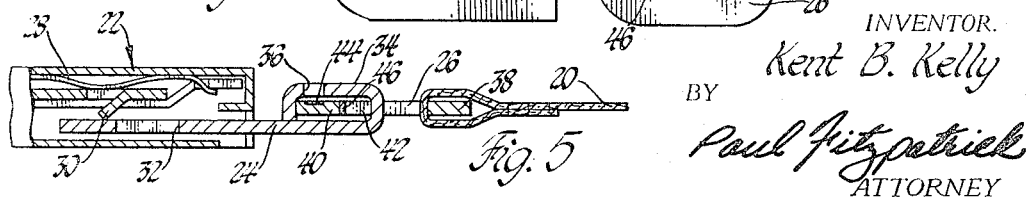
FIGURE 5 is a sectional view taken in the plane of lines 5—5 in FIGURE 4.

The other leg 40 of the rectangular loop 26 is movably positioned in the opening 42 created by the reversely bent portion 34 of the lock plate 24. The leg 40 of the rectangular loop 26 includes a colored indicating portion 44 which may be of any suitable bright, easily noticed color. This indicating portion 44 may be created by merely painting a suitable color on the surface of the leg 40 or by embedding a brightly colored metallic or plastic object into the surface of leg 40. A spring 46 is mounted between the end of the reversely bent portion 34 of the latch plate 24 and the leg 40 of the rectangular loop 26 within the opening 42. This spring 46 normally biases the leg 40 of the rectangular loop 26 into a position so that the brightly colored indicating portion 44 is visible through the indicator slot 36. Hence, in this position the user of the seat belt assembly is warned that the buckle assembly is improperly fastened and that adequate tension has not been applied to the belt. When the latch plate is further inserted into latching engagement with the buckle as shown in FIGURE 3, the tension on the belt 20 then pulls the rectangular loop 26 against the force of the spring 46 to thereby move the indicating portion 44 out of view of the indicating slot 36. Thus, when the seat belt assembly has been properly used with adequate tension and the latch plate and buckle members properly latched, the user of the seat belt assembly is assured of this by the disappearance of the indicating colored portion 44 from view through the indicator slot 36.

Hence, this invention provides a relatively simple and economical, yet practical, mechanical addition to a seat belt assembly which will serve as an indicator to the user that the seat belt assembly is not being properly used. This device then should eliminate to a great extent the problem of improperly used seat belt assemblies and therefore greatly increase the safety benefits received from the proper use of seat belts in automobiles. It should be understood that this device may be applied to any of the seat belt assemblies in a vehicle and is not limited to the one used by the driver.

Although but one embodiment of the subject invention has been shown and described in detail, it should be clear to those skilled in the art to which the invention pertains that many changes and modifications may be made thereto without departing from the scope of the invention.

It is claimed:
1. A seat belt tension indicator including:
   a buckle member adapted to engage another buckle member;
   loop means attached on one side to said seat belt and movably attached on the other side to one of said buckle members, said loop means having an indicator portion thereon visible when said loop means is in a certain position relative to said buckle member;
   and spring means mounted between said loop means and said buckle member to normally bias said loop means into the position where said indicator portion is visible when there is not sufficient tension on said seat belt.
2. A seat belt tension indicator as set forth in claim 1 wherein said loop means moves against the biasing force of said spring means to move said indicator portion to a non-visible position upon the application of adequate tension on said seat belt.
3. A seat selt tension indicator as set forth in claim 1 wherein said buckle member to which said loop means is attached includes an indicator slot in its upper surface through which said indicator portion is visible when said loop means is in the proper position.

4. A seat belt tension indicator as set forth in claim 1 wherein said loop means is rectangular and the buckle member to which it is attached is the latch plate.

5. In combination:
two belt sections;
mutually latching members on said belt sections;
and visible indicator means on one of said latching means operated in response to belt tension.

References Cited by the Examiner
UNITED STATES PATENTS

| 1,944,344 | 1/1934 | Holmes | 73—141 |
| 2,341,534 | 2/1944 | Ammen | 73—141 |
| 2,590,498 | 3/1952 | Bomberger | 73—143 |
| 2,825,224 | 3/1958 | Lindenauer et al. | 73—141 |
| 2,996,587 | 8/1961 | McCarthy | 280—150 |
| 3,166,146 | 1/1965 | Shaw | 280—150 |

FRANK B. SHERRY, *Primary Examiner.*

JAMES T. McCALL, *Examiner.*